United States Patent [19]

Yamazaki et al.

[11] Patent Number: 6,075,065
[45] Date of Patent: Jun. 13, 2000

[54] PHOTOCURABLE RESIN COMPOSITION AND A METHOD FOR PRODUCING THE SAME

[75] Inventors: Kyuya Yamazaki; Mitsuhiro Nishimura; Takashi Uemura, all of Osaka; Akira Yamamoto, Usui-gun; Shouhei Kozakai, Usui-gun; Masatoshi Asano, Usui-gun, all of Japan

[73] Assignees: Takeda Chemical Industries, Ltd., Osaka; Shin-Etsu Chemical Co., Ltd., Tokyo, both of Japan

[21] Appl. No.: 08/985,630

[22] Filed: Dec. 4, 1997

[30] Foreign Application Priority Data

Dec. 20, 1996 [JP] Japan .................................. 8-341674

[51] Int. Cl.⁷ .............................. C08F 2/46; C08G 2/46; C08J 3/28
[52] U.S. Cl. .............................. 522/64; 522/96; 522/90; 522/93; 522/28
[58] Field of Search ................. 522/96, 64, 28, 522/93, 90

[56] References Cited

U.S. PATENT DOCUMENTS

| | | | |
|---|---|---|---|
| 4,324,744 | 4/1982 | Letchtken et al. | 260/932 |
| 4,710,523 | 12/1987 | Lechtken et al. | 522/14 |
| 4,985,472 | 1/1991 | Aosai et al. | 522/64 |
| 5,218,009 | 6/1993 | Rutsch et al. | 522/16 |
| 5,219,896 | 6/1993 | Coady et al. | 522/96 |
| 5,416,880 | 5/1995 | Edwards et al. | 385/128 |
| 5,475,038 | 12/1995 | Skoultchi | 522/96 |
| 5,527,835 | 6/1996 | Shustack | 522/42 |
| 5,534,559 | 7/1996 | Leppard et al. | 522/64 |
| 5,538,791 | 7/1996 | Shustack | 522/42 |
| 5,587,403 | 12/1996 | Shustack | 522/42 |
| 5,664,041 | 9/1997 | Szum | 385/128 |
| 5,732,477 | 3/1998 | Toyama | 34/275 |
| 5,744,514 | 4/1998 | Shustack | 522/42 |
| 5,837,750 | 11/1998 | Szum et al. | 522/81 |

FOREIGN PATENT DOCUMENTS

| | | |
|---|---|---|
| 0 262 629 | 4/1988 | European Pat. Off. . |
| 2-11611 | 1/1990 | Japan . |
| 4-1625 | 1/1992 | Japan . |
| 4-6125 | 1/1992 | Japan . |
| 4-77514 | 3/1992 | Japan . |
| 4-296315 | 10/1992 | Japan . |
| 4-310545 | 11/1992 | Japan . |
| 5-262848 | 10/1993 | Japan . |
| 5-306146 | 11/1993 | Japan . |
| 6-298818 | 10/1994 | Japan . |
| 8-127630 | 5/1996 | Japan . |
| 8-259642 | 10/1996 | Japan . |
| 2 259 704 | 3/1993 | United Kingdom . |
| WO96/29352 | 9/1996 | WIPO . |

OTHER PUBLICATIONS

Valet, A., "Zur Wetterbeständigkeit UV–härtbarer Pulverklarlack", Farbe & Lack, vol. 102, No. 1, 1996, pp. 40–46. See translation of p. 41 of the reference.

Chemistry & Technology of UV & EB Formulation for coatings, Inks & Paints. vol. III: Photoinitiators for Free Radical and Cationic Polymerization. P178, 1991.

*Primary Examiner*—James J. Seidleck
*Assistant Examiner*—Sanza L. McClendon
*Attorney, Agent, or Firm*—Wenderoth Lind & Ponack, L.L.P.

[57] ABSTRACT

The invention provides a photocurable resin composition which inhibits the deactivation of a bisacylphosphine oxide-series photopolymerization initiator and is useful for coating optical fibers. The photocurable resin composition comprises (A) a polyurethane (meth)acrylate oligomer, (B) an ethylenically unsaturated compound, (C) a bisacylphosphine oxide-series photopolymerization initiator, and (D) a tertiary amine and no tin component. Incorporation of the component (D) inhibits the decomposition and deactivation of the component (C). The component (A) may contain an aliphatic $C_{14-40}$ polyol (hydrogenated dimerdiol, 12-hydroxystearyl alcohol) as a polyol component. This resin composition is used for a primary coating of a glass fiber or an indirect coating of an optical fiber through the primary layer, the coating layer being cured by light irradiation to provide an optical fiber coated with the resin composition.

13 Claims, No Drawings

PHOTOCURABLE RESIN COMPOSITION AND A METHOD FOR PRODUCING THE SAME

BACKGROUND OF THE INVENTION

1. Field of the Invention

The present invention relates to a photocurable resin composition which inhibits the deactivation of a photopolymerization initiator and is suitable for coating materials for plastics, wood, ceramics, glasses, metals, paper, etc., photofabricated materials, three-dimensional moulding materials, printing plate materials and the like, particularly suitable for a coating material for optical fibers, a method for producing the resin composition, and an optical fiber.

2. Description of the Related Art

Glass fibers, which are utilized for an optical fiber, are very fragile and subjected to flaws. Besides, they suffer from a greater light transmission loss when contaminated. Therefore, glass fibers are protected and reinforced by a measure which comprises coating the surface of the glass fibers with a urethane (meth)acrylate-series ultraviolet ray-curable resin (hereinafter, it may be referred to simply as a UV resin) immediately after the drawing of the glass fibers (primary coating), and then coating the primary-coated fibers with an ultraviolet ray-curable resin (secondary coating), the former resin having a low Young's modulus as well as being soft and less dependent on temperatures, whereas the latter resin having a high Young's modulus. For identification of optical fibers, they may be sometimes coated with a coloured material (tertiary coating). A piece of fiber thus coated, including the one coated with the tertiary coating, is called an optical fiber elemental strand. The material for bundling the optical fiber elemental strands and making them into such a tape-like structure is called a bundling material (or a taping material). The UV resin is also used as the taping material. An optical cable is constituted with a bunch of several tape core-strands contained in a sheath.

An optical fiber to be led into general homes is called a fiber to the home or a drop wire, which is made of a wire comprising one or a few fiber elemental strands thickly coated with a UV resin having a high Young's modulus.

There are some common characteristics required of these UV-coating resins: to have an appropriate viscosity, to show little changes in viscosity during a long storage, to be rapidly curable and capable of being cured (hardened) even with a low-quantity ultraviolet ray irradiation, to generate only a small amount of hydrogen gas, to ensure long-term reliability of a coated glass fiber, etc.

Recently, the drawing speed of a glass fiber from a molten glass base can be speeded up for the purpose of improving the productivity of optical fibers. However, the high-speed drawing causes to give a less quantity of ultraviolet ray irradiation during the next UV resin-coating process, and ends in giving a cured product (hardened product) with a low Young's modulus. Therefore, there have been suggested resin compositions, as the photopolymerization initiator, which comprises a highly active and quickly curable acylphosphine oxide-series photopolymerization initiator. For example, in regard to a composition comprising a monoacylphosphine oxide, Japanese Patent Application Laid-open Nos. 6125/1992 (JP-A-4-6125) and 296315/1992 (JP-A-4-296315) disclose a photocurable resin composition containing a photopolymerization initiator which comprises a mixture of polyurethane having ethylenically unsaturated bonds, a monomer having an ethylenically unsaturated bond, an acylphosphine oxide, and a compound having a tertiary amino group (a compound having a morpholine ring). These literatures disclose the use of a tin compound as a urethanating catalyst.

As to a composition comprising a bisacylphosphine oxide, Japanese Patent Application Laid-open No. 298818/1994 (JP-A-6-298818) corresponding to U.S. Pat. No. 5,534,559 teaches a photocurable resin composition comprising an ethylenically unsaturated monomer and a bisacylphosphine oxide (e.g. bis(2,4,6-trimethylbenzoyl)-2-methylpropylphosphine oxide).

Japanese Patent Application Laid-open No. 259642/1996 (JP-A-8-259642) discloses a photocurable resin composition comprising a polymer having an ethylenically unsaturated bond such as urethane acrylate, a monomer having an ethylenically unsaturated bond, and a bisacylphosphine oxide (e.g. bis(2,6-dimethoxybenzoyl)-2,4,4-trimethylpentylphosphine oxide) which shows a higher curability than a monoacylphosphine oxide. A tin compound is used as urethanating catalysts in this literature.

Further, Japanese Patent Application Laid-open No. 127630/1996 (JP-A-8-127630) discloses a photocurable resin composition comprising a urethane (meth)acrylate, N-vinylpyrrolidone, a tertiary amine and a photopolymerization initiator (e.g. 2,4,6-trimethylbenzoyl diphenylphosphine oxide). In this literature, too, a tin compound is used as a urethanating catalyst.

Incidentally, Japanese Patent Application Laid-open No. 306146/1993 (JP-A-5-306146) corresponding to U.S. Pat. Nos. 5,527,835, 5,538,791 and 5,587,403 discloses a coating composition comprising a polyether polyolseries urethane oligomer prepared with the use of an aliphatic polyisocyanate, a reactive diluent, a silane compound, and a conventional photopolymerization initiator. This literature suggests a tin compound, a metal salt of an organic acid, an amine, or the like, as the urethanating catalyst.

A resin composition containing an acylphosphine oxide as a photopolymerization initiator has a high photocurability. However, the acylphosphine oxide is deactivated during the storage of the resin composition, and, accordingly, its photocurability is deteriorated to a great extent. Especially in the presence of water, no matter how little the quantity may be, the acylphosphine oxide is deactivated in a short period of time, and, in an extreme case, it completely ceases to act as a coating composition. The deactivation of the photopolymerization initiator may be prevented by excluding water from the resin composition. But it is practically impossible to keep the water content (moisture content) at zero in the resin composition.

In another aspect, the generation of hydrogen gas causes an increase in light transmission loss. Since hydrogen gas has a high diffusion coefficient in resins and glasses, hydrogen diffuses throughout a quartz fiber even under normal conditions for use. The diffused hydrogen is trapped at a defect site of the main components of the quartz fiber, such as $SiO_2$ and a dopant $GeO_2$, whereby, it is assumed, the loss in light transmission increases. Taking this defect into consideration, an ultraviolet ray-curable resin composition for optical fiber coating is desired to give out hydrogen gas in a small quantity. By way of illustration, a coating material for glass fibers is disclosed in Japanese Patent Application Laid-open No. 11611/1990 (JP-A-2-11611), which is prepared by adding a phenolic or sulfuric antioxidant to a composition comprising a compound having an ethylenically unsaturated bond such as a urethane acrylate and a compound having a piperidine ring-containing (meth) acrylate.

This resin composition is effective in reducing the amount of the hydrogen gas generation. However, the addition of the antioxidant causes deteriorations of the curing rate or the gel fraction. Therefore, it is difficult to reduce the generation of hydrogen gas, and to retain the high characteristics of the photocurable resin composition, at the same time.

Japanese Patent Application Laid-open No. 77514/1992 (JP-A-4-77514) teaches that a polyurethane acrylate prepared by using a hydrogenated dimerdiol obtained by hydrogenating a $C_{36}$ dimeric acid shows a high adhesive property to a base having a low surface tension (e.g. the printing surface of an offset ink, polypropylene), and that the cured layer has a low water-absorbability. Japanese Patent Application Laid-open No. 262848/1993 (JP-A-5-262848) corresponding to U.S. Pat. No. 5,416,880 describes that a polyurethane (meth)acrylate based on a polyester polyol having a residue of an optionally hydrogenated dimeric acid exhibits a low water-absorbability and excellent resistance to hot water. Japanese Patent Application Laid-open No. 310545/1992 (JP-A-4-310545) discloses that the secondary coating material and the taping material having a high Young's modulus and showing an elongation property can be made of a polyurethane (meth)acrylate prepared by using a compound with an average molecular weight of 500 or less which contains an OH group at the terminal and no polymerizable vinyl group (e.g. polyhydric alcohols such as 1,10-decanediol, 4,4'-methylenebiscyclohexanol).

SUMMARY OF THE INVENTION

It is, therefore, an object of the present invention to provide a photocurable resin composition (particularly, a photocurable resin composition for the coating of optical fibers) which does not suffer from the deactivation of a photopolymerization initiator even when a UV resin is stored for a long period, and which retains a high photocurability and high-speed coatability for a long time, and a method for producing the resin composition.

It is another object of the present invention to provide a photocurable resin composition (particularly, a photocurable resin composition for the coating of optical fibers) which can prevent the hydrolysis of a bisacylphosphine oxide used as a photopolymerization initiator, and which exhibits excellent quick-curability even with an ultraviolet ray irradiation in a small quantity, and a method for producing the same.

It is a further object of the present invention to provide a photocurable resin composition (particularly, a photocurable resin composition for the coating of optical fibers) which generates less hydrogen gas, and a method for producing the same.

A still further object of the present invention is to provide a photocurable resin composition for the coating of optical fibers which can prevent the increase in light transmission loss, applicable to the primary coating material, the secondary coating material, the taping material and the drop wire coating material of optical fibers, a water-proof fiber cable coating material and a submarine cable buffer.

A yet another object of the present invention is to provide a method for stabilizing a bisacylphosphine oxide-series photopolymerization initiator.

After making intensive researches to achieve the above objects, the inventors of the present invention found:

that the presence of a tin-series catalyst, even in a small amount, causes a drastic increase in the viscosity of a UV resin during its long-term storage, thereby deteriorating the high-speed coatability (coating property) of the UV resin;

that the coexistence of a tin-series catalyst and water (moisture), no matter how little the amount of the water may be, causes a bisacylphosphine oxide to be hydrolysed and deactivated, thereby crucially deteriorating the photocurability of the bisacylphosphine oxide; and that the combination of a bisacylphosphine oxide and a tertiary amine ensures a high photoactivity and photocurability of the bisacylphosphine oxide for a long period, regardless of the presence of water (moisture).

The present invention is based on these findings.

The photocurable resin composition of the present invention comprises (A) a urethane (meth)acrylate oligomer, (B) an ethylenically unsaturated compound, (C) a bisacylphosphine oxide-series photopolymerization initiator shown by the following formula (i),

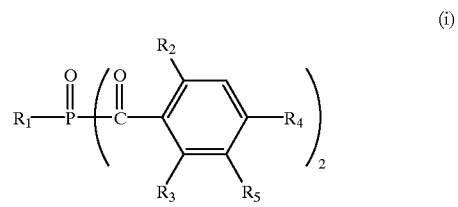

wherein $R_1$ represents a straight or branched (straight-chain or branched-chain) $C_{1\text{-}12}$ alkyl-group, a cycloalkyl group, or an aryl group which may be substituted with a straight or branched $C_{1\text{-}12}$ alkyl group or a halogen atom; $R_2$ and $R_3$ independently represent a hydrogen atom, a straight or branched $C_{1\text{-}12}$ alkyl group or a straight or branched $C_{1\text{-}12}$ alkoxy group; and $R_4$ and $R_5$ independently stand for a hydrogen atom or a straight or branched $C_{1\text{-}12}$ alkyl group, and (D) a tertiary amine and substantially no tin component.

The component (A) includes a urethane (meth)acrylate oligomer prepared by using a $C_{14\text{-}40}$ polyol as a polyol component (e.g. a hydrogenated dimerdiol; aliphatic diols derived from a higher fatty acid such as 12-hydroxystearyl alcohol). The photocurable resin composition is useful as a liquid photocurable resin composition, particularly as a photocurable resin composition for the coating of optical fibers.

The method of the present invention includes a method for producing a photocurable resin composition containing the tertiary amine (D) and substantially no tin component, the method comprising blending the urethane (meth)acrylate oligomer (A), the ethylenically unsaturated compound (B), and the bisacylphosphine oxide-series photopolymerization initiator (C).

The present invention also provides an optical fiber comprising glass fibers which are directly or indirectly coated with a cured layer (hardened layer) of the above photocurable resin composition, and a method for coating the optical fiber which comprises the steps of coating, directly or indirectly, glass fibers with the photocurable resin composition, and curing the resin composition by light irradiation.

The present invention further provides a method for stabilizing the bisacylphosphine oxide-series photopolymerization initiator (C) in the coexistence of the tertiary amine (D) and substantially no tin component.

In the present specification, the phrase "substantially no tin component" means no addition of a tin component or no incorporation of a reaction product obtained with the use of a tin component, except for inevitable contamination with the tin component. Additionally, the terms "acrylic monomer" and "methacrylic monomer" are generically referred to as "(meth)acrylic monomer."

DETAILED DESCRIPTION OF THE INVENTION

The liquid photocurable resin composition of the present invention, which is useful for the coating of optical fibers, comprises the polyurethane (meth)acrylate oligomer (A), the ethylenically unsaturated compound (B), the bisacylphosphine oxide-series photopolymerization initiator (C) of the formula (i), and the tertiary amine compound (D), and is free from tin components. The components (A), (B), (C), and (D) are hereinafter described in detail.

[(A) Polyurethane (meth)acrylate Oligomer]

The polyurethane (meth)acrylate oligomer is obtainable by a urethanation reaction with the use of a polyisocyanate, a polyol component, and a (meth)acrylate having a hydroxyl group. The weight average molecular weight of the polyurethane (meth)acrylate oligomer can be selected from a range of about 200 to 20,000, and preferably about 300 to 10,000.

Polyisocyanate

The polyisocyanate includes aromatic polyisocyanates, araliphatic polyisocyanates, alicyclic polyisocyanates, aliphatic polyisocyanates, and the like. Diisocyanates are generally used as the polyisocyanate.

As the aromatic polyisocyanates, there may be mentioned diisocyanates (e.g. m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, 4,4'-diphenyl ether diisocyanate), polyisocyanates (e.g. triphenylmethane-4,4',4"-triisocyanate, 1,3,5-triisocyanatebenzene, 2,4,6-triisocyanatetoluene, 4,4'-diphenylmethane-2,2',5,5'-tetraisocyanate), and the like.

As the araliphatic polyisocyanates, there may be mentioned diisocyanates (e.g. 1,3- or 1,4-xylylene diisocyanate or a mixture thereof, 1,3- or 1,4-bis(1-isocyanate-1-methylethyl)benzene or a mixture thereof), polyisocyanates (e.g. 1,3,5-triisocyanatemethylbenzene), and so on.

As the alicyclic polyisocyanates, there may be exemplified diisocyanates (e.g. 1,3-cyclopentene diisocyanate, 1,4-cyclohexane diisocyanate, 1,3-cyclo-hexane diisocyanate, 3-isocyanatemethyl-3,5,5-trimethylcyclohexyl isocyanate (i.e. isophorone diisocyanate), 4,4'-methylenebis(cyclohexyl isocyanate), methyl-2,4-cyclohexane diisocyanate, methyl-2,6-cyclohexane diisocyanate, 1,4-bis(isocyanatemethyl) cyclohexane), polyisocyanates (e.g. 1,3,5-triisocyanate cyclohexane, 1,3,5-trimethylisocyanate cyclohexane, 2-(3-isocyanatepropyl)-2,5-di(isocyanatemethyl)-bicyclo(2.2.1) heptane, 2-(3-isocyanatepropyl)-2,6-di(isocyanatemethyl)-bicyclo(2.2.1)heptane, 3-(3-isocyanatepropyl)-2,5-di (isocyanatemethyl)-bicyclo(2.2.1)heptane, 5-(2-isocyanateethyl)-2-isocyanatemethyl-3-(3-isocyanatepropyl)-bicyclo(2.2.1)heptane, 6-(2-isocyanateethyl)-2-isocyanatemethyl-3-(3-isocyanatepropyl)-bicyclo(2.2.1)heptane, 5-(2-isocyanateethyl)-2-isocyanatemethyl-2-(3-isocyanatepropyl)-bicyclo(2.2.1)heptane, 6-(2-isocyanateethyl)-2-isocyanatemethyl-2-(3-isocyanatepropyl)-bicyclo(2.2.1)heptane, and the like.

As the aliphatic polyisocyanates, there may be exemplified diisocyanates (e.g. trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatemethyl caproate), polyisocyanates (e.g. lysine ester triisocyanate, 1,4,8-triisocyanate octane, 1,6,11-triisocyanate undecane, 1,8-diisocyanate-4-isocyanatemethyl octane, 1,3,6-triuisocyanate hexane, 2,5, 7-trimethyl-1,8-diisocyanate-5-isocyanatemethyl octane), and so on.

In addition, derivatives of isocyanate compounds can be employed as the polyisocyanate component. As the isocyanate derivatives, there may be mentioned, for instance, dimer, trimer, biuret, allophanate, carbodiimide, polymethylenepolyphenyl polyisocyanate (crude MDI, c-MDI, polymeric MDI, etc.), crude TDI, and adducts of an isocyanate compound and a low-molecular-weight polyol.

Among these polyisocyanates, diisocyanates may be practically used (e.g. aromatic diisocyanates such as tolylene diisocyanate and 4,4'-diphenylmethane diisocyanate, alicyclic diisocyanates such as isophorone diisocyanate, aliphatic diisocyanates such as hexamethylene diisocyanate).

Polyol Component

The polyol component includes polyols such as polyether polyols, polyester polyols, polycarbonate polyols, and the others.

As the polyether polyols, there may be exemplified homo- or co-polymers of alkylene oxides (e.g. $C_{2-5}$ alkylene oxides such as ethylene oxide, propylene oxide, butylene oxide, tetrahydrofuran, and 3-methyltetrahydrofuran), homo- or co-polymers of the above alkylene oxides and an aliphatic $C_{14-40}$ polyol (e.g. 12-hydroxystearyl alcohol, hydrogenated dimerdiol) as an initiator, adducts of an alkylene oxide (e.g. propylene oxide, butylene oxide, tetrahydrofuran) with bisphenol A, adducts of an alkylene oxide (e.g. propylene oxide, butylene oxide, tetrahydrofuran) with a hydrogenated bisphenol A, etc. These polyether polyols can be used alone or in combination.

Examples of a preferable polyether polyol include a homo- or co-polymer of a $C_{2-4}$ alkylene oxide, particularly a $C_{3-4}$ alkylene oxide (propylene oxide, tetrahydrofuran, etc.) such as polyoxypropylene glycol, polytetramethylene ether glycol, or a copolymer of tetrahydrofuran and propylene oxide), a homo- or co-polymer of the $C_{2-4}$ alkylene oxide and, as a polymerization initiator, an aliphatic $C_{14-40}$ polyol to be named below, and the like.

The weight average molecular weight of the polyether polyol can be selected from a range of about 200 to 10,000, for instance.

The polyester polyols include:

an additional reaction product of a diol component (e.g. $C_{2-40}$ aliphatic diol having a lower molecular weight such as ethylene glycol, propylene glycol, diethylene glycol, dipropylene glycol, 1,4-butanediol, 1,5-pentanediol, 3-methyl-1,5-pentanediol, 1,6-hexanediol, neopentyl glycol, 1,9-nonanediol, 1,10-decanediol, 12-hydroxystearyl alcohol, and a hydrogenated dimer diol; an alkylene oxide adduct of bisphenol A) with a lactone (e.g. ε-caprolactone, δ-valerolactone, β-methyl-δ-v-alerolactone), a reaction product of the above diol component and a dicarboxylic acid (e.g. aliphatic dicarboxylic acids such as succinic acid, adipic acid, azelaic acid, sebacic acid, and dodecanedicarboxylic acid; alicyclic dicarboxylic acids such as hexahydrophthalic acid, and tetrahydrophthalic acid; aromatic dicarboxylic acids such as phthalic acid, isophthalic acid, and terephthalic acid), and an additional reaction product of the above diol component, the above dicarboxylic acid component, and the lactone.

As the polycarbonate polyols, there may be exemplified a polycarbonate diol obtainable by a reaction of the above polyether polyol, polyester polyol, or diol component (e.g. 2-methylpropanediol, dipropylene glycol, 1,4-butanediol, 1,6-hexanediol, 3-methyl-1,5-pentanediol, neopentyl glycol, 1,5-octanediol, 1,4-bis(hydroxymethyl)cyclohexane) with a short-chain dialkyl carbonate (e.g. $C_{1-4}$ alkyl carbonates such as dimethyl carbonate and diethyl carbonate).

Use can be also made of polyether diols and polyester diols which are obtained by adding an alkylene oxide (e.g. ethylene oxide, propylene oxide, butylene oxide, tetrahydrofuran) or a lactone (e.g. ε-caprolactone, β-methyl-δ-valerolactone) to the above-mentioned polycarbonate polyol.

The polycarbonate diol is commercially available under the name of "Desmophene 2020E" (Sumitomo Bayer Urethane Co., Ltd.); "DN-980," "DN-982" and "DN-983" (Nippon Polyurethane Industry, Co., Ltd.), to name a few.

If necessary, use can be made of a low molecular weight polyol. As the low molecular weight polyols, there may be exemplified ethylene glycol, propylene glycol, 1,3- or 1,4-butanediol, neopentyl glycol, 1,6-hexanediol, 1,9-nonanediol, 1,10-decanediol, higher fatty acid polyols and higher hydrocarbon polyols [saturated or unsaturated aliphatic $C_{14-40}$ polyols derived from a higher fatty acid, specific examples being castor oil, coconut oil, monomyristins (1-monomyristin, 2-monomyristin), monopalmitins (1-monopalmitin, 2-monopalmitin), monostearins (1-monostearin, 2-monostearin), monooleins (1-monoolein, 2-monoolein), 9,10-dioxystearic acid, 12-hydroxyricinoleyl alcohol, 12-hydroxystearyl alcohol, 1,16-hexadecanediol (reduction product of juniperic acid or thapsic acid), 1,21-heneicosanediol (reduction product of japanic acid), chimyl alcohol, batyl alcohol, selachyl alcohol, diols from dimer acids (dimerized acid), polybutadienediol or a hydrogenated product thereof], and so on.

In addition to these polyols, silicone polyols (silicon-containing polyols), fluorine-containing polyols, polyolefin polyols or the like can be used, where necessary.

In order to prevent the generation of hydrogen and to reduce the transmission loss in optical fibers, it is desirable that the urethane (meth)acrylate oligomer comprises a $C_{14-40}$ polyol (i.e. aliphatic $C_{14-40}$ polyol, particularly aliphatic $C_{14-40}$ diol) as the polyol component. An advantageous urethane (meth)acrylate oligomer comprises, as the polyol component, an aliphatic $C_{16-38}$ diol or a diol having an aliphatic $C_{16-38}$ diol unit.

The aliphatic $C_{14-40}$ polyol can be used together with the polyether polyol, the polyester polyol, the polycarbonate polyol, polyols having a relatively low molecular weight, etc. The polyurethane (meth)acrylate oligomers containing the aliphatic $C_{14-40}$ polyol unit can be roughly classified into the following three categories.

(A1) Polyurethane (meth)acrylate oligomers whose polyol component comprises (a1) an aliphatic $C_{14-40}$ polyol (A2) Polyurethane (meth)acrylate oligomers whose polyol component comprises a mixture of (a1) an aliphatic $C_{14-40}$ polyol and (a2) another species of polyols (A3) A mixture of the polyurethane (meth)acrylate oligomer (A1) whose polyol component comprises (a1) an aliphatic $C_{14-40}$ polyol, and a polyurethane (meth) acrylate oligomer whose polyol component comprises (a2) another species of polyol except the aliphatic $C_{14-40}$ polyol (a1)

The aliphatic $C_{14-40}$ polyol may be the aliphatic $C_{14-40}$ polyol (a1) alone, or may be used as a polyol having the aliphatic $C_{14-40}$ polyol unit, particularly an alkylene oxide adduct or carbonate adduct of the aliphatic $C_{14-40}$ polyol. In addition, a mixture of the aliphatic $C_{14-40}$ polyol (a1) and another polyol (a2) may be used as such.

Although polybutadienediol or its hydrogenated product can be used as the aliphatic $C_{14-40}$ polyols, practical examples thereof are aliphatic diols derived from a higher fatty acid, such as a hydrogenated dimerdiol, monostearin, and 12-hydroxystearyl alcohol.

The hydrogenated dimerdiol is a diol obtained by hydrogenation of a dimerized fatty acid and having hydroxyl groups at the terminals (i.e. a terminal diol) (particularly, a terminal diol obtained by hydroganation of a highly purified $C_{36}$ dimeric acid). The structures of its main components can be represented by the following formulas (ii) and (iii).

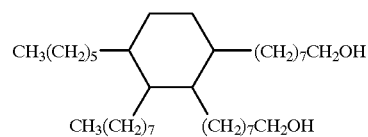

(ii)

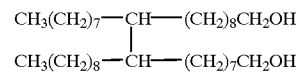

(iii)

In the hydrogenated dimerdiol, the proportion of its components is not strictly limited. For example, a typical proportion of the diols (ii) and (iii) may be such that (ii)/(iii) equals about 3/1 (by weight). The hydrogenated dimerdiols are sold, for example, under the names of "Dimerdiol KX-501" (Arakawa Chemical Industries, Ltd.), "Pespol HP-1000" (Toagosei Co., Ltd.), etc. The 12-hydroxystearyl alcohol is sold under "Loxanol" (Henkel Hakusui, Corp.), to give an example. The polyol (diol, in particular) to be derived from a higher fatty acid does not have to be an isolated pure compound, and may be a polyol composition comprising the polyol as a main component (e.g. 60 to 100% by weight, preferably 75 to 100% by weight).

Examples of the alkylene oxide adduct of the aliphatic $C_{14-40}$ polyol (particularly, diol) (a1) include an adduct with a $C_{2-5}$ alkylene oxide such as ethylene oxide, propylene oxide, butylene oxide, tetrahydrofuran, and 3-methyltetrahydrofuran. Examples of the carbonate adduct include an adduct formed by adding ethylene carbonate. An alkylene oxide adduct of the aliphatic $C_{14-40}$ polyol (particularly, diol) is particularly desirable. Preferable alkylene oxides include, for instance, propylene oxide, butylene oxide, and tetrahydrofuran. Propylene oxide, at least, should be contained in the alkylene oxide adduct in order to provide a less water-absorbable coating material which generates a reduced amount of hydrogen gas and has a high Young's modulus. In the alkylene oxide adduct, the content of the aliphatic $C_{14-40}$ polyol residue is about 5 to 90% by weight, preferably about 10 to 80% by weight, and more preferably about 15 to 70% by weight, for instance.

The average molecular weight of the polyol comprising the aliphatic $C_{14-40}$ polyol unit (a1) is in the range of, for example, about 230 to 10,000, preferably about 286 to 5,000.

The proportion of the aliphatic $C_{14-40}$ polyol can be selected from 1 to 50% by weight, preferably about 2 to 40% by weight, and more preferably about 3 to 30% by weight, based on the total amount of the polyurethane (meth) acrylate. By way of example, the proportion of the hydrogenated dimerdiol is about 3 to 30% by weight, preferably about 5 to 25% by weight, and the proportion of the 12-hydroxystearyl alcohol is about 1 to 14% by weight, preferably about 2 to 10% by weight, each proportion being based on the total amount of the polyurethane (meth) acrylate.

Hydroxyl Group-containing (meth)acrylate

As the (meth)acrylates having a hydroxyl group, there may be mentioned hydroxyalkyl (meth)acrylates (e.g. hydroxy-$C_{2-10}$ alkyl (meth)acrylates including 2-hydroxyethyl (meth)acrylate, 2-hydroxypropyl (meth) acrylate, 3-hydroxypropyl (meth)acrylate, 2-hydroxybutyl (meth)acrylate, 4-hydroxybutyl (meth)acrylate, pentanediol mono(meth)acrylate, hexanediol mono(meth)acrylate, and neopentyl glycol mono(meth)acrylate), 2-hydroxy-3-phenyloxypropyl (meth)acrylate, 2-hydroxyalkyl(meth)

acryloyl phosphates, 4-hydroxycyclohexyl (meth)acrylate, trimethylolpropane di(meth)acrylate, pentaerythritol tri (meth)acrylate, and, additionally, compounds obtained by an additional reaction of a glycidyl or epoxy group-containing compound (e.g. alkyl glycidyl ether, allyl glycidyl ether, glycidyl (meth)acrylate) with (meth)acrylic acid. These hydroxyl group-containing (meth)acrylates can be used singly or in combination.

Preferable hydroxyl group-containing (meth)acrylates include hydroxy-$C_{2-4}$ alkyl (meth)acrylates, in particular, 2-hydroxyethyl (meth)acrylate, 2-hydroxypropyl (meth) acrylate, and the like.

The polyurethane (meth)acrylate oligomer can be prepared by reacting the above-mentioned components. The following is an example of the components and their proportions for the constitution of the polyurethane (meth) acrylate oligomer. The proportion of the hydroxyl group (OH group) in the polyol component is about 0.1 to 0.8 mole, preferably about 0.2 to 0.7 mole, and particularly about 0.2 to 0.5 mole, and the proportion of the hydroxyl group-containing (meth)acrylate is about 0.2 to 0.9 mole, preferably about 0.3 to 0.8 mole, and particularly about 0.5 to 0.8 mole, each relative to 1 mole of the isocyanate group (NCO group) in the polyisocyanate.

The reaction process of the aforesaid components is not strictly specified. The reaction process may comprise the step of blending all the components at the same time, or the steps of reacting the polyisocyanate with one of the polyol component and the hydroxyl group-containing (meth) acrylate and then reacting with the other component.

To prevent the deactivation of the bisacylphosphine oxide-series photopolymerization initiator, it is advantageous to carry out the urethanation reaction of the above components with the use of a non-metallic organic catalyst, particularly an amine-series catalyst (above all, a tertiary amine catalyst), instead of a tin-series catalyst.

[(B) Ethylenically Unsaturated Compound]

As the ethylenically unsaturated compound, use can be made of a polymerizable compound which acts as a reactive diluent and which is liquid or solid at room temperature (about 15 to 30° C.). The ethylenically unsaturated compound includes mono-, bi-, and polyfunctional compounds.

Examples of the monofunctional compounds (monofunctional polymerizable diluent) are ethylenically unsaturated heterocyclic compound (e.g. N-vinyl heterocyclic compounds such as N-vinylpyrrolidone, N-vinylpyridine, and N-caprolactum; heterocyclic (meth) acrylates such as morpholine (meth)acrylate and tetrahydrofurfuryl (meth)acrylate), N-vinylacetamide, N-vinylformamide, dialkylaminoethyl (meth)acrylates (e.g. dimethylaminoethyl (meth)acrylate, diethylaminoethyl (meth)acrylate), N,N'-dimethylacrylamide, alkoxy (poly) alkylene glycol (meth)acrylates (e.g. methoxyethylene glycol (meth)acrylate, methoxypolyethylene glycol (meth) acrylate, butoxypolyethylene glycol (meth)acrylate), alkylphenoxyethyl (meth)acrylates (e.g. nonylphenoxyethyl (meth)acrylate), phenoxy (poly)alkylene glycol (meth) acrylates (e.g. phenoxyethyl (meth)acrylate, phenoxypolyethylene glycol (meth)acrylate), cumylphenol (poly) alkylene (meth)acrylates, alkyl (meth)acrylates (e.g. butyl (meth)acrylate, 2-ethylhexyl (meth)acrylate), cycloalkyl (meth)acrylates (e.g. cyclohexyl (meth)acrylate), aralkyl (meth)acrylates (e.g. benzyl (meth)acrylate), (meth) acrylates having a bridged alicyclic hydrocarbon group (e.g. isobornyl (meth)acrylate, dicyclopentadiene (meth)acrylate, dicyclopentenyl (meth)acrylate, tricyclodecanyl (meth) acrylate, dicyclopentenyloxyalkyl (meth)acrylates, tricyclodecanyloxyethyl (meth)acrylate, isobornyloxyethyl (meth) acrylate), hydroxy group-containing (meth)acrylates (e.g. 2-hydroxypropyl (meth)acrylate, 3-chloro-2-hydroxypropyl (meth)acrylate, 2-hydroxy-3-phenoxypropyl (meth)acrylate, glycerin mono(meth)acrylate, 2-hydroxybutyl (meth) acrylate, polypropylene glycol mono(meth)acrylate, polyethylene glycol nmono(meth)acrylate), poly ε-caprolactone mono(meth)acrylate, glycidyl (meth)acrylate, mono[2-(meth)acryloyloxyethyl] acid phosphate), halogen-containing (meth)acrylates (e.g. trifluoroethyl (meth) acrylate, 2,2,3,3-tetrafluoropropyl (meth)acrylate, 2,2,3,4,4, 4-hexafluorobutyl (meth)acrylate, perfluoro-octylethyl (meth)acrylate), etc.

Examples of the bifunctional compounds (bifunctional polymerizable diluents) are di(meth)acrylate of 2,2-dimethyl-3-hydroxypropyl-2,2-dimethyl-3-hydroxy propionate, (polyoxy)alkylene glycol di(meth)acrylates (e.g. ethylene glycol di(meth)acrylate, diethylene glycol di(meth) acrylate, triethylene glycol di(meth)acrylate, tetraethylene glycol di(meth)acrylate, polyethylene glycol di(meth) acrylate, propylene glycol di(meth)acrylate, polypropylene glycol di(meth)acrylate etc.), 1,4-butanediol di(meth) acrylate, 1,6-hexanediol di(meth)acrylate, neopentyl glycol di(meth)acrylate, pentanediol di(meth)acrylate, glycerin di(meth)acrylate, trimethylolpropane di(meth)acrylate, pentaerythritol di(meth)acrylate, hydroxypivalic acid neopentyl glycol di(meth)acrylate, di(meth)acrylates of an adduct of an alkylene oxide (ethylene oxide, propylene oxide, butylene oxide, etc.) and bisphenol A (e.g. di(meth)acrylate of 2,2-bis(2-hydroxyethoxyphenyl)propane), di(meth)acrylates having a bridged alicyclic hydrocarbon group (e.g. tricyclodecanedimethanol di(meth)acrylate, dicyclopentadiene di(meth)acrylate), (meth)acrylic acid adducts of a bifunctional epoxy resin (e.g. (meth)acrylic acid adduct of 2,2-bis (glycidyloxyphenyl)propane), and so on.

Examples of the polyfunctional compounds (polyfunctional polymerizable diluents) are trimethylolpropane tri(meth)acrylate, trimethylolpropane trioxyethyl(meth) acrylate, pentaerythritol tri(meth)acrylate, pentaerythritol tetra(meth)acrylate, dipentaerythritol hexa(meth)acrylate, tris(acryloyloxy)isocyanurate, tri(meth)acrylate of tris(2-hydroxyethyl) isocyanurate, tri(meth)acrylate of tris (hydroxypropyl) isocyanurate, triallyl trimellitic acid, triallyl isocyanurate, and the like.

These ethylenically unsaturated compounds can be used alone or in combination. They can be selected in accordance with the species of a base or the coating form for an optical fiber. By way of illustration, monofunctional compounds are practically employed as the primary coating material, the secondary coating material, the taping material and the drop wire for optical fibers, typical examples of the compounds including N-vinyl-nitrogen-containing heterocyclic compound (e.g. N-vinylpyrrolidone, N-vinylcaprolactum), acrylates having a bridged alicyclic hydrocarbon group (e.g. isoboryl acrylate, dicyclopentadiene acrylate, isobornyloxyethyl acrylate, tricyclodecanedimethanol acrylate). For the formation of a hard coating layer, the bifunctional compounds (e.g. (polyoxy)alkylene glycol di(meth)acrylates, di(meth)acrylates of an alkylene oxide adduct of bisphenol A), or the polyfunctional compounds (e.g. trimethylolpropane tri(meth)acrylate) may be practically employed if necessary, together with the monofunctional compounds.

The amount of the ethylenically unsaturated compound can be selected from a range of about 10 to 200 parts by weight, preferably about 20 to 150 parts by weight, and more preferably about 30 to 100 parts by weight relative to 100 parts by weight of the urethane (meth)acrylate oligomer, depending on the species of the polyurethane (meth)acrylate oligomer and the ethylenically unsaturated compound, or the desired viscosity of the resin composition.

[(C) Photopolymerization Initiator of the Formula (i)]

The bis-acylphosphine oxide compound to be used as the photopolymerization initiator is shown by the following formula (i),

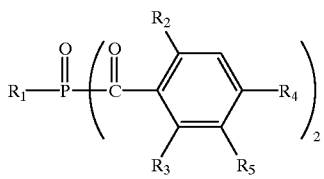

(i)

wherein $R_1$ represents a straight or branched $C_{1-12}$ alkyl group, a cycloalkyl group, or an aryl group which may be substituted with a straight or branched $C_{1-12}$ alkyl group or a halogen atom; $R_2$ and $R_3$ independently represent a hydrogen atom, a straight or branched $C_{1-12}$ alkyl group or a straight or branched $C_{1-12}$ alkoxy group; and $R_4$ and $R_5$ independently stand for a hydrogen atom or a straight or branched $C_{1-12}$ alkyl group.

As the straight or branched (straight-chain or branched) $C_{1-12}$ alkyl groups, there may be exemplified methyl, ethyl, propyl, isopropyl, butyl, s-butyl, t-butyl, pentyl, isopentyl, 2,4,4-trimethylpentyl, hexyl, isohexyl, 2,4,4-trimethylhexyl, octyl, decyl, dodecyl groups and the like. A preferable $R_1$ is a branched $C_{6-12}$ alkyl group, particularly a branched $C_{6-10}$ alkyl group.

Examples of the cycloalkyl group are cyclopentyl, cyclohexyl, cyclooctyl and other $C_{3-10}$ cycloalkyl groups, particularly $C_{5-10}$ cycloalkyl groups.

The aryl group, which includes phenyl and naphthyl groups, may be substituted with a straight or branched $C_{1-12}$ alkyl group or a halogen atom. The $C_{1-12}$ alkyl group includes the above-mentioned alkyl groups, and is preferably a straight or branched $C_{1-4}$ alkyl group (e.g. methyl, ethyl, propyl, isopropyl, butyl, t-butyl groups). The halogen atom includes fluorine, chlorine, bromine and iodine atoms.

As the straight or branched $C_{1-12}$ alkoxy groups, there may be mentioned, for instance, methoxy, ethoxy, propoxy, isopropoxy, butoxy, isobutoxy, s-butoxy, t-butoxy, pentyloxy, hexyloxy, octyloxy groups, and others. A preferable alkoxy group is a straight or branched $C_{1-4}$ alkoxy group.

A preferable combination of the substituents is given below.

$R_1$: $C_{1-12}$ alkyl group, or aryl group (particularly, branched $C_{6-12}$ alkyl group and phenyl group)

$R_2$, R3: $C_{1-4}$ alkyl group (particularly, $C_{1-2}$ alkyl group), or $C_{1-4}$ alkoxy group (particularly, $C_{1-2}$ alkoxy group)

$R_4$, $R_5$: hydrogen atom, or $C_{1-4}$ alkyl group (particularly, methyl group)

Specific examples of the bisacylphosphine oxide-series photopolymerization initiator are bis(2,6-di-$C_{1-2}$ alkoxybenzoyl)-branched $C_{6-12}$ alkylphosphine oxides including bis(2,6-dimethoxybenzoyl)-2,4,4-trimethylpentylphosphine oxide (BAPO); bis(2,4,6-tri-$C_{1-2}$ alkylbenzoyl)-$C_{1-6}$ alkylphosphine oxides including bis(2,4,6-trimethylbenzoyl)methylphosphine oxide, bis(2,4,6-trimethylbenzoyl)ethylphosphine oxide, and bis(2,4,6-trimethylbenzoyl)n-butylphosphine oxide; and bis(2,4,6-tri-$C_{1-2}$ alkylbenzoyl)-arylphosphine oxides including bis(2,4,6-trimethylbenzoyl)phenylphosphine oxide (Irgacure 819).

These bisacylphosphine oxide-series photopolymerization initiators can be used independently or in combination.

Further, these bisacylphosphine oxide-series photopolymerization initiators can be used in combination with other photopolymerization initiators (e.g. acetophenone- or propiophenone-series photopolymerization initiator, benzoine- or benzophenone-series photopolymerization initiator, thioxantone-series photopolymerization initiator).

As the acetophenone- or propiophenone-series photopolymerization initiators, there may be mentioned alkyl phenyl ketones or derivatives thereof (e.g. 2,2-dimethoxy-2-phenylacetophenone, acetophenone diethyl ketal, diethoxyacetophenone, and other acetophenones or their derivatives; 2-hydoxy-2-methyl-1-phenylpropan-1-one (e.g. "Darocure 1173," Ciba Specialty Chemicals Inc.), 2-benzyl-2-dimethylamino-1-(4-morpholinophenyl)-butanone (e.g. "Irgacure 369," Ciba Specialty Chemicals Inc.), 2-methyl-2-morpholino(4-thiomethylphenyl)propan-1-one (e.g. "Irgacure 907," Ciba Specialty Chemicals Inc.), an oligomer of 2-hydroxy-2-methyl-1-[4-(1-methylvinyl)phenyl] propanone (e.g. "Esacure-KIP," Lamberti spa) and other propiophenones or their derivatives; benzyl or its derivatives (e.g. benzyl, benzyl dimethyl ketal, such as "Irgacure 651," Ciba Specialty Chemicals Inc.; "Lucirin BDK," BASF A.G.), etc.

As the benzoin-series photopolymerization initiators, there may be mentioned benzoin, benzoin methyl ether, benzoin ethyl ether, benzoin isopropyl ether, benzoin isobutyl ether, etc.

As the benzophenone-series photopolymerization initiators, there may be exemplified benzophenone and its derivatives inclusive of benzophenone, o-benzoylmethylbenzoate, 4-phenylbenzophenone, 3,3'-dimethyl-4-methoxybenzophenone, 4,4'-dimethoxybenzophenone, 4-benzoyl-4'-methyldiphenyl sulfide, 2,4,6-trimethylbenzophenone, (4-benzoylbenzyl) trimethyl ammoniumchloride, etc.

The thioxantone-series photopolymerization initiator includes 2- or 4-isopropylthioxantone, 2,4-diethylthioxantone, 2,4-dichlorothioxantone, to name a few.

The photopolymerization initiators further include 1-hydroxycyclohexyl phenyl ketone (e.g. "Irgacure 184," Ciba Specialty Chemicals Inc.), methyl phenyl glyoxy ester ("Vicure 55," AKZO NOBEL Coatings K.K.), 3,6-bis(2-morpholinoisobutyl)-9-butylcarbazol ("A-Cure 3," Asahi Denka Kogyo K.K.), titanocene compound, and so on.

A photopolymerization initiator system comprising the bisacylphosphine oxide-series photopolymerization initiator and another photopolymerization initiator is commercially available under the names of "Irgacure 1700: bis(2,6-dimethoxybenzoyl)-2,4,4-trimethylpentylpho sphine oxide/2-hydroxy-2-methylphenylpropan-1-one=25/75 (weight percent)," and "Irgacure 1800: bis(2,6-dimethoxybenzoyl)-2,4,4-trimethylpentylphosphine oxide/1-hydroxycyclohexyl-phenyl ketone=25/75 (weight percent)," both manufactured by Ciba Specialty Chemicals Inc.

The amount of the photopolymerization initiator may be practically selected from a range of about 0.1 to 10 parts by weight, preferably about 0.5 to 5 parts by weight (e.g. 1 to 5 parts by weight) relative to 100 parts by weight of the total amount of the urethane (meth)acrylate oligomer (A) and the ethylenically unsaturated compound (B).

[(D) Tertiary Amine]

One of the features of the present invention resides in that the combination of the bisacylphosphine oxide-series photopolymerization initiator (C) with the tertiary amine (D) serves, in a system containing substantially no tin component, to inhibit the deactivation of the component (C) for a long time regardless of the presence of water, thereby retaining the high photo-activity of the component (C). In general, the composition of the present invention contains substantially no tin component. The tertiary amine in the composition of the present invention may derive from a urethanating catalyst for the synthesis of the component (A) or from a tertiary amine added to the composition.

As the tertiary amine, use can be made of a compound having at least one tertiary nitrogen atom in a molecule.

Examples of the tertiary amine having one nitrogen atom in a molecule are aliphatic amines (e.g. tri-$C_{1-6}$ alkylamine such as triethylamine and tributylamine, β-(dimethylamino) propionitrile), alicyclic amines (e.g. di-$C_{1-6}$ alkyl-$C_{3-10}$ cycloalkylamines inclusive of N,N-dimethylcyclohexylamine and N,N-diethylcyclohexylamine; N,N-dicyclohexylmethylamine), heterocyclic amines (e.g. N-methylmorpholine, N-ethylmorpholine, N-(2-hydroxyethyl)morpholine, N-metylpyrrolidone), aromatic amines (e.g. N,N-dimethyl-p-toluidine), etc.

Examples of the tertiary amine having two nitrogen atoms in a molecule are aliphatic amines (e.g. N,N,N',N'-tetramethyl ethylenediamine, N,N,N', N'-tetramethyl propane-1,3-diamine, N,N,N',N'-tetramethyl hexane-1,6-diamine, bis(N,N-dimethylaminoethyl) ether, bis(2-dimethylaminoethyl) ether, ethylene glycol bis(3-dimethylaminopropyl) ether), alicyclic amines (e.g. N'-cyclohexyl-N,N-dimethylformamidine), heterocyclic amines (e.g. N,N'-dimethylpiperazine, trimethylpiperazine, 1,2-piperidinoethane, bis(aminopropyl)piperazine, N-methyl-N'-(2-hydroxyethyl)piperazine, N-(N', N'-dimethylaminoethyl)morpholine, bis(morpholinoethyl) ether, bis(2,6-dimethylmorpholinoethyl) ether, 1,2-dimethylimidazol, N-methylimidazol, 1,4-diazine; diazabicyclo[2.2.2]-octane (DABCO), 1,4-diazabicyclo[3.3.0]oct-4-en, 1,5-diazabicyclo[4.3.0]-nona-5-en (DBN), 1,8-diazabicyclo[5.4.0]undece-7-en (DBU) and its phenol salt and octylic acid salt), etc.

Examples of the tertiary amine having three nitrogen atoms in a molecule are aliphatic amines (e.g. N,N,N',N', N"-pentamethyl diethylenetriamine, N,N,N',N",N"-pentamethyl dipropylenetriamine, tetramethyl guanidine), alicyclic amines (e.g. N-cyclohexyl-N',N',N",N"-tetramethyl guanidine), heterocyclic amines (e.g. N-methyl-N'-(2-dimethylamino)ethylpiperazine, 1,5,7-triazabicyclo[4.4.0]dece-5-en), etc.

Examples of the tertiary amine having four nitrogen atoms in a molecule are aliphatic amines (e.g. 1,1,4,7,10,10-hexamethyl triethylenetetramine), heterocyclic amines (e.g. 1,3,5-tris(N,N-dimethylpropyl)hexahydro-1,3,5-triazine), etc.

These tertiary amines can be used singly or as a mixture of two or more components.

Among the aforesaid tertiary amines, compounds having at least two tertiary nitrogen atoms in a molecule are desirable.

The amount of the tertiary amine can be selected from a range for not deteriorating the stability of the photopolymerization initiator (C). For example, its amount is about 0.001 to 1.0% by weight, preferably about 0.005 to 0.5% by weight, and more preferably about 0.01 to 0.2% by weight (particularly, about 0.01 to 0.1% by weight) relative to the amount of the polyurethane (meth)acrylate oligomer (A). If the amount of the tertiary amine is below 0.001% by weight, the activity of the component (C) tends to weaken in the coexistence of water. On the other hand, if the amount exceeds 1.0% by weight, the Young's modulus of the cured layer is likely to decrease.

The proportion of the bisacylphosphine oxide-series photopolymerization initiator (C) relative to the tertiary amine (D), the former/the latter (by weight), is in a range of about 100/0.1 to 100/10, preferably about 100/0.5 to 100/5, and more preferably about 100/1 to 100/3, so as to keep the stability of the component (C).

[Photopolymerization Promoter (sensitizer)]

For the promotion of the photopolymerization reaction in the presence of the photopolymerization initiator, various photopolymerization promoters can be incorporated into the resin composition of the present invention, if necessary. Examples of the photopolymerization promoter include dialkylaminobenzoic acids and derivatives thereof (e.g. 4-dimethylaminobenzoic acid, 4-dimethylaminobenzoate), phosphine-series photopolymerization promoters (e.g. phosphine-series compounds including arylphosphines such as triphenylphosphine, and alkylphosphines such as trialkylphosphine), and so on. These photopolymerization promoters can be used alone or in combination, in an amount of about 0.01 to 10 parts by weight relative to 100 parts by weight of the total amount of the polyurethane (meth)acrylate oligomer (A) and the ethylenically unsaturated compound (B).

[Stabilizer and Antioxidant]

The composition of the present invention may contain a small amount of a stabilizer, such as a hindered phenol-series antioxidant, a hindered amine-series antioxidant, a sulfur-series antioxidant, and the like.

As the hindered phenol-series antioxidants, there may be mentioned compounds having a hydroxyphenyl group substituted with a t-butyl group, such as 2,6-di-t-butyl hydroxytoluene, 2,2'-methylenebis(4-methyl-6-t-butylphenol), 4,4'-butylidenebis(3-methyl-6-t-butylphenol), triethylene glycol-bis[(3-t-butyl-5-methyl-4-hydroxyphenyl)propionate], 1,6-hexanediol-bis[3-(3,5-di-t-butyl-4-hydroxyphenyl)propionate], pentaerythritoltetrakis[3-(3,5-di-t-butyl-4-hydroxyphenyl)propionate], 2,4-bis[(n-octylthio)-6-(4-hydroxy-3,5-di-t-butylanilino)]-1,3,5-triazine, 2,2-thio-diethylenebis[3-(3,5-di-t-butyl-4-hydroxyphenyl)propionate], octadecyl-3-(3,5-di-t-butyl-4-hydroxyphenyl)propionate, 2,2'-thiobis(4-methyl-6-t-butyl) phenol, 4,4'-thiobis(3-methyl-6-t-butyl)phenol, N,N'-hexamethylenebis(3,5-di-t-butyl-4-hydroxyhydrocinnamide, 3,5-di-t-butyl-4-hydroxybenzylphosphonate-diethyl ester, etc.

Examples of the hindered amine-series antioxidant include bis-(2,2,6,6-tetramethylpiperidinyl-4-sebacate), dimethyl succinate-1-(2-hydroxyethyl)-4-hydroxy-2,2,6,6-tetramethylpiperidyl condensates.

Examples of the sulfur-series antioxidant include dilauryl-3,3'-dithiopropionate, dimyristyl-3,3'-dithiopropionate, distearyl-3,3'-dithiopropionate, pentaerythritol-tetrakis-(β-lauryl-thiopropionate), ditridecyl-3,3'-dithiopropionate, 2-mercaptobenzimidazol, etc.

These antioxidants are usually added in an amount of not more than 2.0% by weight (0 to 2% by weight) based on the whole of the resin composition. The amount is preferably in a range of about 0.1 to 1.0% by weight based on the total amount of the resin composition in the aspects of the hydrogen gas generation and the curing rate or speed.

Where necessary, various additives may be added to the resin composition of the present invention. The additives include not only the aforesaid components, but also stabilizers inclusive of other antioxidants and ultraviolet ray-absorbers, plasticizers, organic solvents, silane coupling agents, surfactants, colouring agents, organic or inorganic powders, and the like.

The photocurable resin composition comprising the tertiary amine and being free from tin components can be prepared by blending the urethane (meth)acrylate oligomer (A), the ethylenically unsaturated compound (B), and the bisacylphosphine oxide-series photopolymerization initiator (C). The tertiary amine (D) may be incorporated into the resin composition in addition to the above components, or may derive from a tertiary amine catalyst used in the preparation of the component (A). By way of illustration, the resin composition can be provided by mixing or blending (A) a urethane (meth)acrylate oligomer prepared in the absence of the catalyst (D) or in the presence of a catalyst excluding tin-series, lead-series, and tertiary amine catalysts, (B) the ethylenically unsaturated compound, (C) the bisacylphosphine oxide-series photopolymerization initiator, and (D) the tertiary amine. In a preferred embodiment, the photocurable resin composition is obtained by blending (A) a urethane (meth)acrylate oligomer prepared in the presence of the tertiary amine (D), (B) the ethylenically unsaturated compound, and (C) the photopolymerization initiator. After the preparation of the component (A) by a urethanation reaction in the presence of the tertiary amine (D), the component (D) may be further added to the resin composition, if necessary.

According to the method of the present invention, the bisacylphosphine oxide-series photopolymerization initiator (C) can be stabilized in the coexistence of the tertiary amine (D) with containing no tin component. Especially, even in the presence of water, the present invention inhibits the deactivation of the photopolymerization initiator (C) and keeps it stable for a long period. By preventing the photopolymerization initiator, bisacylphosphine oxide, from being deactivated by hydrolysis, the photocurable resin composition, after kept in storage for a long period, maintains not only an excellent high-speed coatability (coating property) but also remarkable curability (curing property) even with a low quantity of ultraviolet irradiation (low irradiation energy). Thanks to these properties, the resin composition is applicable to coating materials for plastics, wood, ceramics, paper, glasses and other base materials, photo-fabricated materials, three-dimensional moulding materials, printing plate materials, and the like. Further, owing to its low hydrogen gas generation, this photocurable resin composition is particularly useful as a coating material for optical fibers.

The photocurable resin composition for the coating of optical fibers is suitable for directly or indirectly coating a glass fiber with a cured layer. Depending on the characteristics of a cured resin (e.g. Young's modulus), the resin composition of the present invention is employed as (i) a photocurable coating material for coating a glass fiber directly with a primary coating layer, or (ii) a photocurable coating material for coating an optical fiber indirectly, at least through the primary coating layer. The coating materials for the indirect coating of an optical fiber can be applied to materials for fiber elemental strands (coating materials) such as a secondary coating layer and a tertiary coating layer (colouring layer) of optical fibers, a taping material for forming tape corestrands made up of plural fiber elemental strands (element wires), coating materials for drop wires, coating (covering) materials for water-proof fiber cables, a submarine cable buffer, etc. The optical fiber coated with the cured layer of the resin composition is produced by coating (covering) a glass fiber directly, or coating an optical fiber indirectly, with the resin composition, and curing (hardening) the resin composition by light irradiation (particularly, by ultraviolet ray irradiation).

Due to the presence of the tertiary amine, the photocurable resin composition of the present invention is able to prevent the bisacylphosphine oxide-series photopolymerization initiator from being deactivated by hydrolysis for a long period, to retain a high photocurability even with a small quantity of ultraviolet ray irradiation, and to ensure a remarkable high-speed coatability. Besides, the resin composition can maintain its characteristics at high levels, and keep the amount of hydrogen gas generation low. Therefore, the resulting coating material can provide a cured layer having stabilized characteristics, thereby enhancing long-term reliability of optical fibers. For this reason, the photocurable resin composition of the present invention is particularly useful as an optical fiber-coating material.

The following examples are intended to describe the present invention in further detail and should by no means be interpreted as defining the scope of the invention.

EXAMPLES

1. Preparation of Polyethers

Synthesis Example 1

A reactor was charged with 5.49 kg of a hydrogenated dimerdiol (Toagosei Co., Ltd., "Pespol HP-1000," OH value: 200 mg/KOH), and 25 g of potassium hydroxide. The addition reaction was conducted with the use of 4.51 kg of propylene oxide in a nitrogen stream at 110 to 120° C. After the completion of the reaction, water and synthesised magnesium silicate (Kyowa Chemical Co., Ltd., "Kyoward 600") were added to the reaction mixture to adsorb the potassium hydroxide, which was then removed by filtration. The remaining mixture was dehydrated until its water content fell below 0.05% by weight. Thus obtained was a polyether having a number average molecular weight of 1,000 (hereinafter indicated as "DDP-1000," content of the hydrogenated dimerdiol residue: 56.0% by weight).

Synthesis Example 2

A reactor was charged with of 3.1 kg of Loxanol (content of 12-hydroxystearyl alcohol: about 80% by weight, Henkel Hakusui Co., Ltd., OH value: 357 mg/KOH), and 25 g of potassium hydroxide. The addition reaction was conducted with the use of 6.90 kg of propylene oxide in a nitrogen stream at 110 to 120° C. After the reaction, water and synthesised magnesium silicate (Kyowa Chemical Co., Ltd., "Kyoward 600") were added to the reaction mixture to adsorb the potassium hydroxide, which was then filtered out. The remaining mixture was dehydrated until its water content fell below 0.05% by weight. Thus obtained was a polyether having a number average molecular weight of 1,000 (hereinafter indicated as "LXP-1000," content of the 12-hydroxystearyl alcohol residue: 21.8% by weight).

2. Synthesis of Tertiary Amine-containing Polyurethane (meth)acrylate Oligomers

Synthesis Example 3

A mixture of 696.8 g of 2,4-tolylene diisocyanate and 1,000 g of "DDP-1000" obtained in Synthetic Example 1 was made to react for three hours under a nitrogen atmosphere at 70 to 80° C. The reaction mixture was cooled to 40° C., and then the reaction vessel was purged with dry air. In the reaction vessel, 0.72 g of 2,6-di-t-butylhydroxytoluene (BHT) and 696.0 g of 2-hydroxyethyl acrylate were supplied, and allowed to react for two hours at 60 to 70° C. With an addition of 1.20 g of 1,5,7-triazabicyclo[4.4.0]decene-5 (TABD), the reaction was continued for further four hours to give a polyurethane acrylate oligomer (hereinafter referred to as "oligomer A"). The infrared absorption spectrum (IR-spectrum) of the oligomer indicated no absorption due to an isocyanate group (NCO).

Synthesis Example 4

As in Synthesis Example 3, 209.2 g of 2,4-tolylene diisocyanate, 171.9 g of polytetrametylene ether glycol (number average molecular weight: 3,000), 79.6 g of "DDP-1000" of Synthesis Example 1, 28.7 g of tripropylene glycol, and 5.8 g of ethylene bis(hydroxyethyl sulfide) were allowed to react. Added to the reaction mixture were 0.21 g of BHT, 204.8 g of 2-hydroxyethyl acrylate, and 0.7 g of TABD. A polyurethane acrylate oligomer (hereinafter referred to as "oligomer B") was obtained in the same manner as in Synthesis Example 3.

Synthesis Example 5

A mixture of 696.8 g of 2,4-tolylene diisocyanate and 1,000 g of "LXP-1000" of Synthesis Example 2 was allowed to react for three hours under a nitrogen atmosphere at 70 to 80° C. The reaction mixture was cooled to 40° C., and then the reaction vessel was purged with dry air. In the reaction vessel, 0.72 g of BHT and 696.0 g of 2-hydroxyethyl acrylate were supplied, and allowed to react for two hours at 60 to 70° C. With an addition of 0.48 g of 1,1,4,7,10,10-hexamethyltriethylenetetramine (HMTA), the reaction was continued for further four hours to give a polyurethane acrylate oligomer (hereinafter referred to as "oligomer C"). The infrared absorption spectrum (IR-spectrum) of the oligomer indicated no absorption due to an NCO group.

Synthesis Example 6

As in Synthesis Example 3, 662.0 g of 2,4-tolylene diisocyanate, 474.0 g of polytetrametylene ether glycol (number average molecular weight: 3,000), 220.0 g of polyoxypropylene glycol (number average molecular weight: 1,000), 96.4 g of tripropylene glycol, and 37.7 g of "Loxanol" were allowed to react. Added to the reaction mixture were 0.64 g of BHT, 649.6 g of 2-hydroxyethyl acrylate, and 2.14 g of N,N,N',N'-tetrameth yl ethylenediamine (TMEDA). A polyurethane acrylate oligomer (hereinafter referred to as "oligomer D") was obtained in the same manner as in Synthesis Example 3.

Synthesis Example 7

As in Synthesis Example 3, 696.8 g of 2,4-tolylene diisocyanate, 552.5 g of polytetramethylene ether glycol (number average molecular weight: 650), 450.0 g of polyoxypropylene glycol (number average molecular weight: 3,000) were allowed to react. Added to the reaction mixture were 0.72 g of BHT, 696.0 g of 2-hydroxyethyl acrylate, and 1.20 g of N,N,N',N'',N''-pentamethyl diethylenetriamine (PMDETA). A polyurethane acrylate oligomer (hereinafter referred to as "oligomer E") was obtained in the same manner as in Synthesis Example 3.

3. Synthesis of Tin Catalyst-containing Polyurethane (meth)acrylate Oligomers

Synthesis Example 8

A polyurethane acrylate oligomer (hereinafter referred to as "oligomer F") was obtained in the same manner as in Synthesis Example 6, except for using 0.43 g of dibutyl tin dilaurate (DBTDL) instead of 2.14 g of TMEDA, the urethanating catalyst used in Synthesis Example 6.

Synthesis Example 9

A polyurethane acrylate oligomer (hereinafter referred to as "oligomer G") was obtained in the same manner as in Synthesis Example 7, except for using 0.24 g of tetra-n-butyl-1,3-diacetoxydistanoxane (TK-1) instead of 1.20 g of PMDETA, the urethanating catalyst used in Synthesis Example 7.

4. Stability of Bisacylphosphine Oxide in the Presence of Water

Samples containing 0.15% by weight of water were prepared by adding water to a mixture of 100 g of isobornyl acrylate (IBXA), 3 g of a bisacylphosphine oxide-series photopolymerization initiator (Irgacure 1700: a mixture comprising bis(2,6-dimethoxybenzoyl)-2,4,4-trimetylpentylphosphine oxide/2-hydroxy-2-methylphenylpropan-1-one=25/75 (weight percent); Ciba Specialty Chemicals Inc.), and 0.04 g of one of the urethanating catalysts below.

Urethanating catalyst
DBU: 1,8-diazabicyclo-[5.4.0]-undecene-7
PMDETA: N,N,N',N'',N''-pentamethyl diethylenetriamine
TMEDA: N,N,N',N'-tetramethyl ethylenediamine
DBTDL: dibutyl tin dilaurate
TK-1: tetra-n-butyl-1,3-diacetoxydistanoxane The thus obtained samples were heated at 60° C. for 48 hours. Thereafter, the decomposition rate of the acylphosphine oxide was measured by NMR. The results were given in Table 1.

TABLE 1

| | SAMPLES | | | | |
|---|---|---|---|---|---|
| | 1 | 2 | 3 | 4 | 5 |
| IBXA (by weight) | 100 | 100 | 100 | 100 | 100 |
| Irgacure 1700 (by weight) | 3 | 3 | 3 | 3 | 3 |
| [Tertiary amine] | | | | | |
| DBU (by weight) | 0.04 | — | — | — | — |
| TMEDA (by weight) | — | 0.04 | — | — | — |
| PMDETA (by weight) | — | — | 0.04 | — | — |
| [Tin compound] | | | | | |
| DBTDL (by weight) | — | — | — | 0.04 | — |
| TK-1 (by weight) | — | — | — | — | 0.04 |
| Bisacylphosphine oxide decomposition rate (%) | 0 | 0 | 0 | 71 | 95 |

5. Preparation of Ultraviolet Ray-curable Resin Compositions

Examples 1–5 and Comparative Examples 1–2

Ultraviolet ray-curable resin compositions were prepared using the oligomers A-G obtained in Synthesis Examples 3–9, acrylic monomers (isobornyl acrylate (IBXA), N-vinylpyrrolidone (NVP), tricyclodecanedimethanol diacrylate (R-684)), a photopolymerization initiator (Irgacure 1700: a mixture comprising bis-(2,6-dimethoxybenzoyl)-2,4,4-trimethylpentylphosphine oxide/2-hydroxy-2-methylphenylpropan-1-one=25/75 (weight percent), Ciba Specialty Chemicals Inc.). Table 2 shows the proportions of these components in the resin compositions. In Table 2, the amount of the tertiary amine is based on the amount of the polyurethane acrylate oligomer. The amounts of hydrogen generation out of the resin compositions thus obtained, and the changes in the physical properties of the cured coating layers were measured in the manners indicated below. The results were compiled in Table 3.

6. Evaluation
(a) Preparation of Cured Coating Layers (cured film)
Each of the above-mentioned ultraviolet ray-curable resin compositions, allowed to stand at 40° C. for a predetermined period (0, 15, 30, or 45 days), was coated on a glass plate in a thickness of about 200 μm. Under a nitrogen atmosphere, it was cured by irradiating ultraviolet rays (wavelength: 350 nm. metal halide lamp) of 25 mJ/cm$^2$ or 500 mJ/cm$^2$.
(b) Measurement of Hydrogen Gas Generation Quantity
The ultraviolet ray-curable resin composition was cured, just after its production, by irradiating ultraviolet rays (wavelength: 350 nm) of 500 mJ/cm$^2$ to give a film. The cured film was allowed to stand for over 24 hours at 23° C., 50% relative humidity (R.H.). Then, the cured film was put in a head space bottle and left standing for 48 hours at 100° C. The amount of the generated hydrogen gas was measured by gas chromatography.
(c) Measurement of Young's Modulus, and Rate of Retention
The cured film obtained in the process (a) was peeled off from the glass plate and conditioned at 23° C. and relative humidity of 50% for more than 24 hours, to serve it as measurement of Young's modulus (2.5% tensile modulus). The Young's modulus of the film was measured under the conditions of the bench mark width 25 mm and the pulling speed 1 mm/min. Based on the values of the Young's modulus in regard to the cured films of the 45-day-old resin composition and of the fresh resin composition (zero day old), the retention rate of the modulus was calculated by the following formula.

Retention rate=(Young's modulus of 45-day-old resin composition)/(Young's modulus of 0-day-old resin composition)×100%

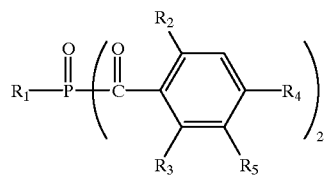

(i)

wherein $R_1$ represents a straight or branched $C_{1-12}$ alkyl group, a cycloalkyl group, or an aryl group which may be substituted with a straight or branched $C_{1-12}$ alkyl group or a halogen atom; $R_2$ and $R_3$ independently represent a hydrogen atom, a straight or branched $C_{1-12}$ alkyl group, or a straight or branched $C_{1-12}$ alkoxy group; and $R_4$ and $R_5$ independently represent a hydrogen atom or a straight or branched $C_{1-12}$ alkyl group, and (D) a tertiary amine as a urethanating catalyst, said photocurable resin composition having substantially no tin component and being substantially free from a tin-series catalyst to prevent the deactivation of the bisacylphosphine oxide-series photopolymerization initiator.

2. The photocurable resin composition as claimed in claim 1, wherein $R_1$ is a branched $C_{6-12}$ alkyl group, a $C_{5-10}$ cycloalkyl group, or an aryl group which may be substituted

TABLE 2

|  | Ex. 1 | Ex. 2 | EX. 3 | Ex. 4 | Ex. 5 | Comp. Ex. 1 | Comp. Ex. 2 |
| --- | --- | --- | --- | --- | --- | --- | --- |
| Tertiary amine or Tin component (Species, % by weight) | | | | | | | |
| Oligomer A: TABD 0.05 | 70 | | | | | | |
| Oligomer B: TABD 0.10 | | 70 | | | | | |
| Oligomer C: HMTA 0.02 | | | 70 | | | | |
| Oligomer D: TMEDA 0.10 | | | | 70 | | | |
| Oligomer E: PMDETA 0.05 | | | | | 70 | | |
| Oligomer F: DBTDL 0.02 | | | | | | 70 | |
| Oligomer G: TK-1 0.02 | | | | | | | 70 |
| Isobornyl acrylate (% by weight) | 20 | 20 | 20 | 20 | 20 | 20 | 20 |
| N-vinylpyrrolidone (% by weight) | 10 | 10 | 10 | 10 | | 10 | 10 |
| R-684 (% by weight) | | | 10 | | 10 | | |
| Photopolymerization Initiator: Irgacure 1700 (% by weight) | 3 | 3 | 3 | 3 | 3 | 3 | 3 |

TABLE 3

|  |  | Ex. 1 | Ex. 2 | Ex. 3 | Ex. 4 | Ex. 5 | Comp. Ex. 1 | Comp. Ex. 2 |
| --- | --- | --- | --- | --- | --- | --- | --- | --- |
| Hydrogen gas generation quantity (μL/g) | | 4.0 | 1.9 | 5.0 | 1.6 | 3.5 | 7.6 | 9.1 |
| Young's modulus (MPa) | | | | | | | | |
| days passed | UV dose (mJ/cm²) | | | | | | | |
| 0 | 25 | 800 | 720 | 750 | 750 | 650 | 750 | 640 |
|  | 500 | 1030 | 880 | 940 | 850 | 780 | 850 | 790 |
| 15 | 25 | 780 | 700 | 760 | 750 | 640 | 540 | 450 |
|  | 500 | 1000 | 890 | 930 | 870 | 790 | 750 | 700 |
| 30 | 25 | 760 | 700 | 740 | 750 | 660 | 550 | 420 |
|  | 500 | 980 | 900 | 900 | 840 | 800 | 720 | 640 |
| 45 | 25 | 770 | 710 | 720 | 730 | 630 | 480 | 340 |
|  | 500 | 1000 | 890 | 900 | 860 | 800 | 700 | 540 |
| Retention rate (%) | 25 | 96 | 99 | 96 | 97 | 97 | 64 | 53 |
|  | 500 | 97 | 101 | 96 | 102 | 102 | 82 | 68 |

What is claimed is:

1. A photocurable resin composition which comprises (A) a urethane (meth)acrylate oligomer containing a $C_{14-40}$ polyol unit as a polyol component, (B) an ethylenically unsaturated compound, (C) a bisacylphosphine oxide-series photopolymerization initiator shown by the following formula (i), with a straight or branched $C_{1-4}$ alkyl group; $R_2$ and $R_3$ independently represent a hydrogen atom, a straight or branched $C_{1-4}$ alkyl group or a straight or branched $C_{1-4}$ alkoxy group; and $R_4$ and $R_5$ independently represent a hydrogen atom or a straight or branched $C_{1-4}$ alkyl group.

3. The photocurable resin composition as claimed in claim 1, wherein $R_1$ is a branched $C_{6-12}$ alkyl group; each of $R_2$ and $R_3$ is a $C_{1-2}$ alkyl group or a $C_{1-2}$ alkoxy group; and each of $R_4$ and $R_5$ is a methyl group.

4. The photocurable resin composition as claimed in claim 1, wherein the proportion of the bisacylphosphine oxide-series photopolymerization initiator relative to the tertiary amine is such that the former/the latter is in the range of 100/0.1 to 100/10 (by weight).

5. The photocurable resin composition as claimed in claim 4, wherein said $C_{14-40}$ polyol unit is an aliphatic diol derived from a higher fatty acid.

6. The photocurable resin composition as claimed in claim 5, wherein said $C_{14-40}$ polyol unit is at least one member selected from the group consisting of a hydrogenated dimerdiol and 12-hydroxystearyl alcohol.

7. The photocurable resin composition as claimed in claim 1, wherein said urethane (meth)acrylate oligomer (A) is:

(A1) a polyurethane (meth)acrylate oligomer whose polyol component comprises an aliphatic $C_{14-40}$ polyol, (A2) a polyurethane (meth)acrylate oligomer whose polyol component comprises a mixture of the aliphatic $C_{14-40}$ polyol and at least one member selected from the group consisting of polyether polyols, polyester polyols, and polycarbonate polyols, or (A3) a mixture of the polyurethane (meth)acrylate oligomer (A1), and a polyurethane (meth)acrylate oligomer whose polyol component comprises at least one member selected from the group consisting of polyether polyols, polyester polyols, and polycarbonate polyols.

8. The photocurable resin composition as claimed in claim 5, wherein the proportion of the $C_{14-40}$ polyol unit is 1 to 50% by weight based on the total amount of the polyurethane (meth)acrylate oligomer.

9. The photocurable resin composition as claimed in claim 1, which is used for the coating of an optical fiber.

10. A method for producing a photocurable resin composition containing (D) a tertiary amine as a urethanating catalyst, which method comprises mixing (A) a urethane (meth)acrylate oligomer containing a $C_{14-40}$ polyol unit as a polyol component, (B) an ethylenically unsaturated compound, and (C) the bisacylphosphine oxide-series photopolymerization initiator of claim 1, said photocurable resin composition having substantially no tin component and being substantially free from a tin-series catalyst to prevent the deactivation of the bisacylphosphine oxide-series photopolymerization initiator.

11. A method for coating an optical fiber which comprises the steps of coating a glass fiber directly or indirectly with the photocurable resin composition of claim 1, and curing the resin composition by light irradiation.

12. A photocurable resin composition which comprises (A) a urethane (meth)acrylate oligomer containing a unit of a copolymer of an alkylene oxide and an aliphatic $C_{14-40}$ polyol, (B) an ethylenically unsaturated compound, (C) the bisacylphosphine oxide-series photopolymerization initiator of claim 1, and (D) a tertiary amine as a urethanating catalyst, said photocurable resin composition having no tin component and being substantially free from a tin-series catalyst to prevent the deactivation of the bisacylphosphine oxide-series photopolymerization initiator.

13. A photocurable resin composition as claimed in claim 12, wherein the urethane (meth)acrylate oligomer (A) is an oligomer containing a unit of a copolymer of a $C_{2-4}$ alkylene oxide and an aliphatic $C_{14-40}$ polyol.

* * * * *

UNITED STATES PATENT AND TRADEMARK OFFICE
CERTIFICATE OF CORRECTION

PATENT NO. : 6,075,065
DATED : June 13, 2000
INVENTOR(S) : Kyuya YAMAZAKI et al.

It is certified that error appears in the above-identified patent and that said Letters Patent is hereby corrected as shown below:

In the Claims:

Column 21, lines 15 and 16 change, "claim 4" to --claim 1--;
Column 21, lines 18 and 19 change, "claim 5" to --claim 1--;
Column 22, lines 1 and 2 change, "claim 5" to --claim 1--.

Signed and Sealed this

Third Day of April, 2001

Attest:

NICHOLAS P. GODICI

Attesting Officer    Acting Director of the United States Patent and Trademark Office